(12) United States Patent
Zhao

(10) Patent No.: US 12,507,212 B2
(45) Date of Patent: Dec. 23, 2025

(54) RESOURCE ALLOCATION METHOD AND RESOURCE ALLOCATION APPARATUS

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 366 days.

(21) Appl. No.: 18/013,428

(22) PCT Filed: Aug. 3, 2020

(86) PCT No.: PCT/CN2020/106594
§ 371 (c)(1),
(2) Date: Dec. 28, 2022

(87) PCT Pub. No.: WO2022/011753
PCT Pub. Date: Jan. 20, 2022

(65) Prior Publication Data
US 2023/0254818 A1 Aug. 10, 2023

(30) Foreign Application Priority Data
Jul. 16, 2020 (WO) ................ PCT/CN2020/102458

(51) Int. Cl.
*H04W 72/02* (2009.01)
*H04L 5/00* (2006.01)
*H04W 72/0446* (2023.01)
*H04W 72/0453* (2023.01)
*H04W 72/0457* (2023.01)

(52) U.S. Cl.
CPC .......... *H04W 72/02* (2013.01); *H04L 5/0051* (2013.01); *H04W 72/0446* (2013.01); *H04W 72/0453* (2013.01); *H04W 72/0457* (2023.01)

(58) Field of Classification Search
CPC ............. H04W 72/02; H04W 72/0446; H04W 72/0453; H04W 72/0457; H04W 4/70; H04W 72/11; H04W 72/40; H04L 5/0051; H04L 27/2613; H04L 5/0033; H04L 5/0039; H04L 5/0048; H04L 5/0082; H04L 5/0091; H04L 5/001
See application file for complete search history.

(56) References Cited

U.S. PATENT DOCUMENTS

2016/0095092 A1 3/2016 Khoryaev et al.
2022/0039080 A1* 2/2022 Khoryaev ............. H04W 4/025
2022/0416976 A1* 12/2022 Baek .................... H04W 72/51

FOREIGN PATENT DOCUMENTS

CN 106664518 A 5/2017
CN 107852574 A 3/2018
(Continued)

OTHER PUBLICATIONS

Indian Patent Application No. 202347008471, Office Action dated Sep. 1, 2023, 6 pages.
(Continued)

*Primary Examiner* — Rina C Pancholi
(74) *Attorney, Agent, or Firm* — Cozen O'Connor

(57) ABSTRACT

A resource allocation method includes determining a first resource allocation parameter. The first resource allocation parameter is used for indicating a first resource, and the first resource is used for transmitting a ranging reference signal.

19 Claims, 5 Drawing Sheets determining a first resource allocation parameter, the first resource allocation parameter being configured to indicate a first resource, the first resource being configured to transmit a ranging reference signal — S11

(56) References Cited

FOREIGN PATENT DOCUMENTS

CN          111213393 A     5/2020
WO    WO 2019036578 A1    2/2019

OTHER PUBLICATIONS

PCT/CN2020/106594, English translation of International Search Report dated Apr. 8, 2021, 3 pages.
Chinese Patent Application No. 202310462194.6, Office Action with English translation dated Jun. 15, 2025, 15 pages.

\* cited by examiner

RESOURCE ALLOCATION METHOD AND RESOURCE ALLOCATION APPARATUS

CROSS-REFERENCE TO RELATED APPLICATION

The present application is a U.S. National Stage of International Application No. PCT/CN2020/106594, filed on Aug. 3, 2020, which claims the benefit of priority to International Application No. PCT/CN2020/102458, filed on Jul. 16, 2020, the entire contents of both applications are incorporated by reference herein in their entireties for all purposes.

BACKGROUND

With the emergence of new-generation Internet applications, wireless communication technologies are driven to constantly evolve to meet requirements of the applications.

Currently, applications and services based on a distance and an angle between user equipment are constantly emerging. By measuring the distance and the angle through a wireless signal, a wireless communication capability of the user equipment can be effectively utilized, and a new capability of the user equipment may be introduced. A terminal and a wireless network device that support a ranging function can more easily control and operate the measurements of the distance and the angle, and can be applied to a variety of commercial and vertical application scenarios, including commodity display, smart home, smart city, smart transportation, smart retail, and so on.

SUMMARY

The present disclosure relates to a field of communication technologies, and in particular, to a resource allocation method and a resource allocation apparatus.

According to a first aspect of embodiments of the present disclosure, a resource allocation method is provided, and includes determining a first resource allocation parameter. The first resource allocation parameter is configured to indicate a first resource, and the first resource is configured to transmit a ranging reference signal.

According to a second aspect of embodiments of the present disclosure, a resource allocation apparatus is provided, and includes: a processor; and a memory configured to store an instruction executable by the processor. The processor is configured to determine a first resource allocation parameter. The first resource allocation parameter is configured to indicate a first resource, and the first resource is configured to transmit a ranging reference signal.

It is to be understood that the general description above and the detailed description in the following are merely illustrative and explanatory, and cannot limit the present disclosure.

BRIEF DESCRIPTION OF THE DRAWINGS

The accompanying drawings herein, which are incorporated in and constitute a part of the specification, illustrate embodiments consistent with the present disclosure and, together with the specification, serve to explain the principles of the present disclosure.

DETAILED DESCRIPTION

Illustrative embodiments will be described in detail herein, examples of which are shown in the accompanying drawings. When the following description relates to the accompanying drawings, unless otherwise specified, same numbers in different accompanying drawings denote same or similar elements. Implementations described in the following illustrative embodiments do not represent all implementations consistent with the present disclosure. Instead, they are merely examples of apparatuses and methods consistent with some aspects of the present disclosure as recited in the appended claims.

With the development of a new-generation 5G mobile communication technology, a technology of using a new radio (NR) cellular communication network for uplink and downlink transmission to locate the user equipment is studied in 3GPP Rel-16. However, how to use NR sidelinks for inter-user ranging has not yet been discussed.

Figures 1, 2:
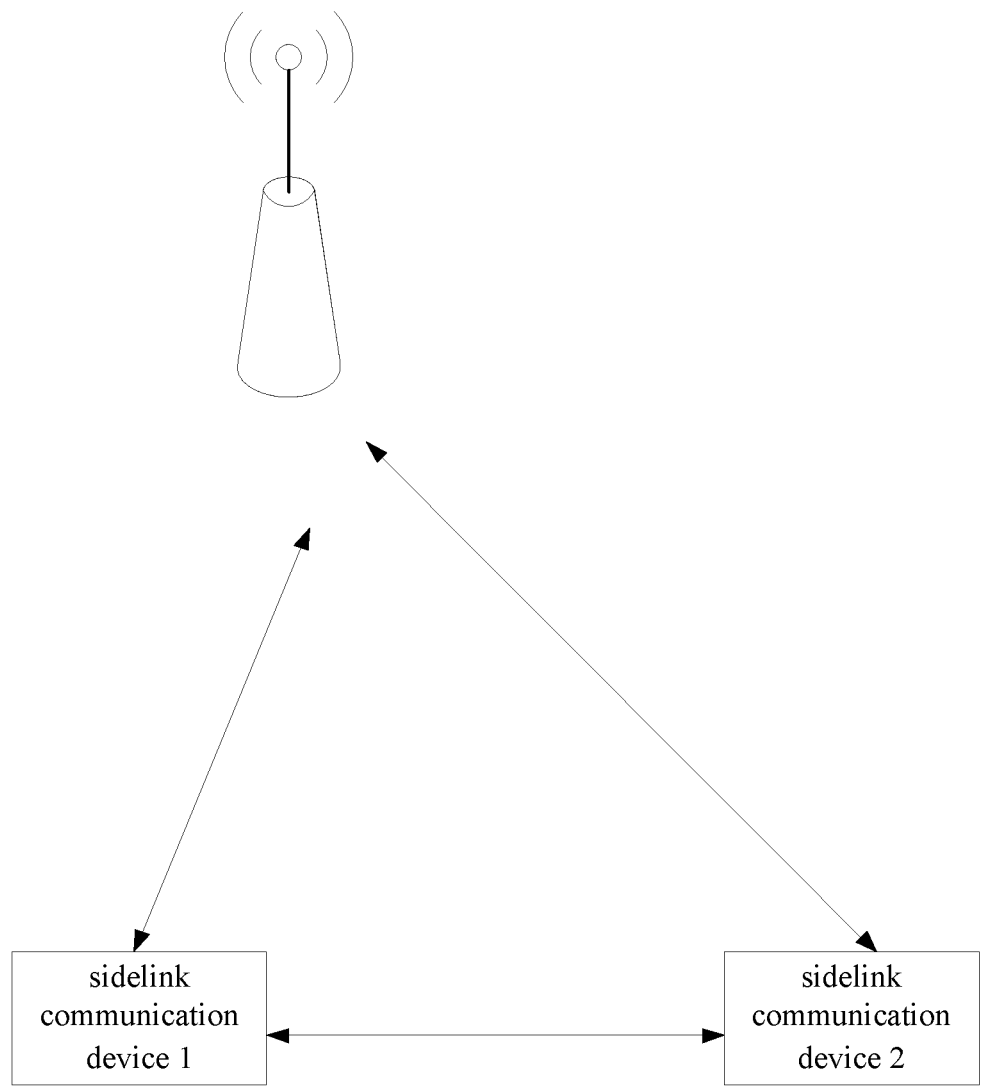
FIG. 1 is a schematic diagram of a sidelink communication system according to an illustrative embodiment.
FIG. 2 is a flow chart of a resource allocation method according to an illustrative embodiment.

A resource allocation method according to an embodiment of the present disclosure is applicable to a sidelink communication system shown in FIG. 1. Referring to FIG. 1, in a scenario of sidelink communication between sidelink communication devices, a network device configures a sidelink communication device 1 with a variety of transmission parameters for data transmission. The sidelink communication device 1 serves as a data sending terminal, and a sidelink communication device 2 serves as a data receiving terminal, which two conduct direct communication. Links for communication between the network device and the sidelink communication devices are uplinks and downlinks. Links between the sidelink communication devices are sidelinks.

In the present disclosure, a communication scenario of direction communication between the sidelink communication devices may also be a device to device (D2D) communication scenario. In an embodiment of the present disclosure, the sidelink communication devices that conducts the direct communication may include various types of handheld devices, vehicle-mounted devices, wearable devices, and computing devices with a wireless communication function, or other processing devices connected to a wireless modem, and various forms of user equipment (UE), mobile stations (MSs), terminals, terminal equipment, and the like. For ease of description, in the embodiments of the present disclosure, the following descriptions are based on an example in which the sidelink communication device is the user equipment.

In NR, time resources and frequency resources are allocated to the user equipment for sidelink communication by configuring or pre-configuring parameters such as a sidelink bandwidth part (BWP) and a sidelink resource pool on a sidelink communication carrier frequency. The sidelink bandwidth part specifies a sub-carrier interval, a cyclic prefix (CP) size, and a section of continuous frequency domain positions used by the user equipment for sidelink communication. The sidelink resource pool is defined at the continuous frequency domain position specified by the sidelink bandwidth part, and ranges of the time resources and the frequency resources that can be used by the user equipment to send and/or receive sidelink communication signals are further determined. In R16 NR, the user equipment may have one sidelink bandwidth part, but may have a plurality of sidelink resource pools.

At present, physical channels in an NR sidelink communication system include a physical sidelink broadcast channel (PSBCH), a physical sidelink share channel (PSSCH), a physical sidelink control channel (PSCCH), and a physical sidelink feedback channel (PSFCH). Physical reference signals include a primary sidelink synchronization signal (PSSS), a secondary sidelink synchronization signal (SSSS), a demodulation reference signal (DMRS), a channel-state information reference signal (CSI-RS), a phase tracking reference signal (PT-RS), and the like. A demand of ranging through sidelink signals is not taken into account in the existing NR sidelink communication system. Therefore, due to different design purposes, the current existing channels or reference signals in the NR sidelink communication system are not suitable for ranging.

In view of this, an embodiment of the present disclosure provides a resource allocation method to determine resource allocation parameters for indicating resources that are used to transmit ranging reference signals, so as to realize allocation of resources for the ranging reference signals.

In the embodiment of the present disclosure, for ease of description, the resource used to transmit the ranging reference signal is referred to as a first resource. The resource allocation parameter for indicating the first source is referred to as a first resource allocation parameter.

FIG. 2 is a flow chart of a resource allocation method according to an illustrative embodiment. As shown in FIG. 2, the resource allocation method includes the following steps.

At step S11, a first resource allocation parameter is determined, the first resource allocation parameter is configured to indicate a first resource, and the first resource is configured to transmit a ranging reference signal.

In the embodiment of the present disclosure, the first resource may be a frequency resource, or may be a time resource, or may include a time resource and a frequency resource.

In an implementation of the embodiment of the present disclosure, the time resource and/or the frequency resource used by the ranging reference signal are/is indicated in a static or semi-static manner. In an example, the first resource allocation parameter is carried in pre-configuration information, a static instruction, or a semi-static instruction. The semi-static instruction includes a downlink semi-static instruction. For example, a downlink semi-static instruction of a network device is used to configure the time resource and/or the frequency resource used by the ranging reference signal. Or, the semi-static instruction includes a sidelink semi-static control instruction. For example, the sidelink semi-static control instruction is used to configure the time resource and/or the frequency resource used by the ranging reference signal. In another example, when a user equipment is outside a coverage area of a cellular network, the pre-configuration information pre-configured in the user equipment may also be used to determine the configuration of the time resource and/or the frequency resource used by the ranging reference signal.

In an embodiment of the present disclosure, the resource allocation method as referred to in the embodiment of the present disclosure will be described below in combination with practical applications.

In an implementation, the first resource is at least part of resources in a sidelink resource pool. Reuse of an existing sidelink communication design may be maximized by specifying part of time resources and/or frequency resources in the sidelink resource pool for transmission of the ranging reference signal. However, selection of a transmission bandwidth of the ranging reference signal is limited by the existing sidelink resource pool, which may affect the performance of ranging.

In another implementation, the first resource is at least part of resources in a sidelink bandwidth part. Part of time resources and/or frequency resources are indicated on the sidelink bandwidth part used in sidelink communication for the transmission of the ranging reference signal, which is more conducive to the design of a new ranging reference signal, gives full play to the role of the ranging reference signal, improves the accuracy of ranging, but requires more protocol changes and implementation complexity. In the embodiment of the present disclosure, the time resources and/or the frequency resources may not belong to any sidelink resource pool.

In yet another implementation, the first resource is at least part of resources in a specified sidelink bandwidth part. The first resource is configured as all resources of the specified sidelink bandwidth part. The first resource may allocate a separate bandwidth part for sidelink ranging to the transmission of the ranging reference signal, which is more conducive to the design of a new ranging reference signal, gives full play to the role of the ranging reference signal, and improves the accuracy of ranging. The first resource may also be part of resources in the specified sidelink bandwidth part.

In still another implementation, the first resource allocation parameter directly indicates a sub-carrier width and a CP length used for transmission of the ranging reference signal, may also directly indicate a time domain position of the first resource determined according to the sub-carrier width and the length, or directly indicates an absolute frequency domain position of a frequency domain reference point and indicates a frequency domain offset of the first resource relative to the frequency domain reference point. In other words, the first resource allocation parameter includes one or more of the following: a specified sub-carrier width and a cyclic prefix length; time domain positions indicated by the specified sub-carrier width and the cyclic prefix length; and an absolute frequency domain position of a frequency domain reference point, and a frequency domain offset of the first resource relative to the frequency domain reference point.

In an implementation of the embodiment of the present disclosure, specified time resources and/or frequency resources are configured by pre-configuration or downlink control signaling.

The resources configured for the specified time resources and/or frequency resources respectively will be described below.

Firstly, the time resource and/or the frequency resource used to transmit the ranging reference signal are/is described in a case that the first resource is part of resources in the sidelink resource pool.

In the embodiment of the present disclosure, part of the time resources and/or the frequency resources are specified in the sidelink resource pool for the transmission of the ranging reference signal. In the embodiment of the present disclosure, resources used by other sidelink physical channels and signals transmitted in the sidelink resource pool are different from the sources used to transmit the ranging reference signal. Or, it may also be understood as that the other sidelink physical channels and signals transmitted in the sidelink resource pool do not use the time resources and/or frequency resources used by the ranging reference signal.

In the embodiment of the present disclosure, the first resource may be a specified resource that occurs periodically in time-domain. The first resource allocation parameter for indicating the first resource that occurs periodically in time-domain may include one or more of: a value of a time domain cycle, a starting position of the time domain cycle, and a size and/or a position of a specific time resource within one cycle.

A unit of the time domain cycle of the first resource as referred to in the embodiment of the present disclosure may be frames, sub-frames, time slots, time domain symbols or other time units, and may also be seconds, milliseconds, or microseconds. When being the time unit, the unit of the cycle may be defined in a physical time unit or a logical time unit.

In an example, when the value of the time domain cycle is configured, a time unit belonging to the sidelink resource pool is defined as a logical time unit set, and a value of a logical cycle is defined in the logical time unit set. For example, a set of ten continuous physical time units is {n, n+1, ..., n+10}, and {n, n+2, n+4, ..., n+10} belongs to the sidelink resource pool. When the value of the cycle is 4, starting from time unit n, the resource includes a time unit set {n, n+4, n+8} if the unit of the cycle is a physical time unit, and the resource includes a time unit set {n, n+8} if the unit of the cycle is a logical time unit.

In an example, when the starting position of the time domain cycle is configured, a starting time unit position of a first cycle after a predefined time unit number may be indicated.

In an example, when the size and/or the position of the specific time resource of the time domain cycle within one cycle are/is configured, the following manner may be adopted.

For example, a length of the cycle is N time units, and an N-bit bitmap may be used to indicate which specific time units may be used to transmit the ranging reference signal. Here, the N time units and the time units indicating the value of the cycle may be the same or different. For example, if the cycle is 4 slots, each slot includes 14 time domain symbols, and at least 2 orthogonal frequency division multiplexing (OFDM) symbols are occupied by single transmission of the ranging reference signal, a 28-bit bitmap may be used to indicate time domain symbols that may be used to transmit the ranging reference signal. Or, the specific time resource may also be indicated by a method of indicating a starting position within a distance cycle plus a time domain length. For example, the cycle is 4 slots, each slot includes 14 time domain symbols, and at least 2 OFDM symbols are occupied by single transmission of the ranging reference signal. In an example of the present disclosure, a table of mapping between the starting position plus the time domain length and a configuration number is configured, as shown in Table 1 below.

TABLE 1

| Configuration number | Starting position | Duration |
|---|---|---|
| 0 | $10^{th}$ symbol of first slot | 4 symbols |
| 1 | $12^{th}$ symbol of first slot | 2 symbols |
| ... | ... | ... |

The size and the starting position of the specific time resource may be determined by indicating the configuration number, and then the first resource may be configured.

In an embodiment of the present disclosure, the first resource may include specified resources continuous in frequency-domain.

A wideband of the ranging reference signal in frequency-domain has a great influence on the accuracy of ranging. The ranging reference signal is transmitted by using a section of continuous frequency resource, which can improve the accuracy of ranging and reduce complexity of processing the ranging reference signal. In the embodiment of the present disclosure, the first resource allocation parameter corresponding to the specified resources continuous in frequency-domain may include a frequency domain starting position and a frequency domain width. The frequency domain starting position and the frequency domain width may be indicated by information domains independent from each other or by a single information domain. Granularity indicated by the frequency domain may be a sub-carrier, a physical resource block (PRB), or a set of a plurality of continuous PRBs, etc.

Further, the ranging reference signal is a signal with a signal format. The ranging reference signals with different signal formats may use different generation sequences, have different frequency domain widths and time domain lengths, and have different resource multiplexing manners. Therefore, in the embodiment of the present disclosure, the signal format of the ranging reference signal corresponds to one or more of: the time domain length, the frequency domain width, and the resource multiplexing manner.

Furthermore, the ranging reference signal a signal with a transmission parameter. The transmission parameter may include a multiplexing factor, a generation sequence number, a possible frequency domain width/time domain length, and a transmission power configuration of the ranging reference signal. In the embodiment of the present disclosure, the transmission parameter of the ranging reference signal corresponds to one or more of: the time domain length, the frequency domain width, and the transmission power configuration.

In the embodiment of the present disclosure, different ranging reference signals may have different signal formats and/or transmission parameters.

Further, in the embodiment of the present disclosure, the first resource used to transmit the ranging reference signal may be frequency-division multiplexed and/or time-division multiplexed with a resource used to send a communication sidelink signal. Or, the first resource used to transmit the ranging reference signal may be frequency-division multiplexed and/or time-division multiplexed with a resource used to send other communication sidelink physical channels.

Figure 3:
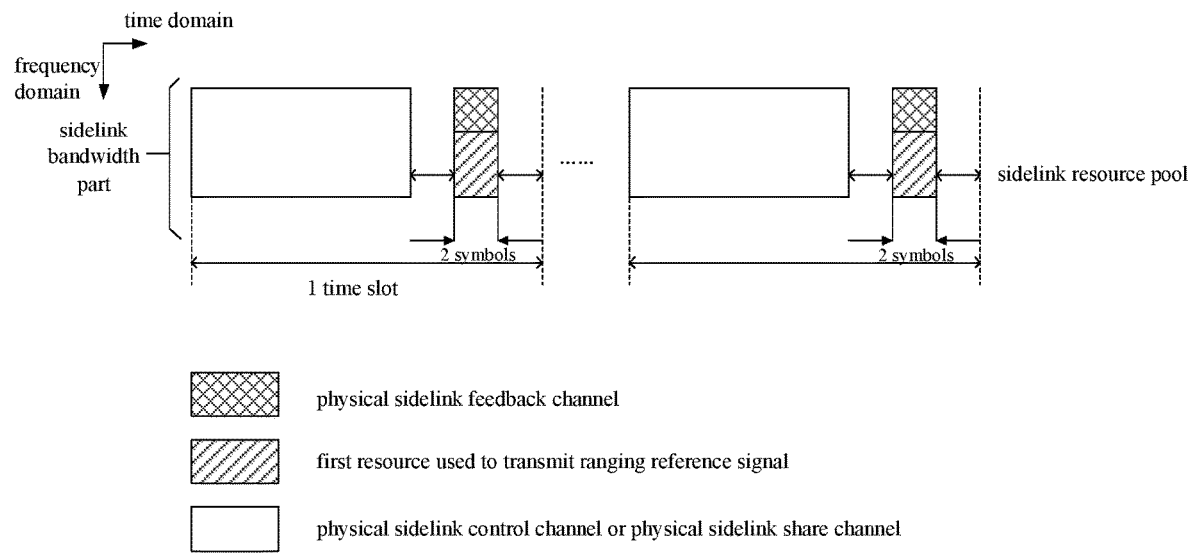
FIG. 3 is a schematic diagram showing that a first resource is frequency-division multiplexed with a physical sidelink feedback channel and is time-division multiplexed with a physical sidelink control channel or a physical sidelink share channel according to an illustrative embodiment of the present disclosure.

In an implementation, the first resource is frequency-division multiplexed with a physical sidelink feedback channel, and is time-division multiplexed with a physical sidelink control channel or a physical sidelink share channel. FIG. 3 is a schematic diagram showing that the first resource is frequency-division multiplexed with the physical sidelink feedback channel, and is time-division multiplexed with the physical sidelink control channel or the physical sidelink share channel according to an illustrative embodiment of the present disclosure. Referring to FIG. 3, the first resource used to transmit the ranging reference signal is frequency-division multiplexed with the physical sidelink feedback channel (PSFCH), and is time-division multiplexed with the physical sidelink control channel (PSCCH)/the physical sidelink share channel (PSSCH). Generally, the ranging reference signal occupies a short time length in time-domain and a wide frequency domain bandwidth in frequency-domain, so as to obtain a great timing accuracy. The physical sidelink feedback channel occupies a length of 2 symbols, while the physical sidelink control channel or the physical sidelink share channel generally occupies more time domain symbols. Moreover, each piece of sidelink feedback information has a length of only 1 PRB, which occupies much fewer frequency domain resources than sidelink data and control, and is more suitable for frequency division multiplexing with the ranging signal.

In the embodiment of the present disclosure, a guard period exists between the physical sidelink control channel/the physical sidelink share channel and the resource used to transmit the ranging reference signal that is time-division multiplexed. That is, a guard period exists between the first resource and the physical sidelink control channel/the physical sidelink share channel. In the embodiment of the present disclosure, the guard period is arranged for the user equipment to switch the time of a transceiver. The user equipment may need to receive the ranging reference signal after sending the physical sidelink control channel/the physical sidelink share channel or need to send the ranging reference signal after receiving the physical sidelink control channel/the physical sidelink share channel.

Figure 4:
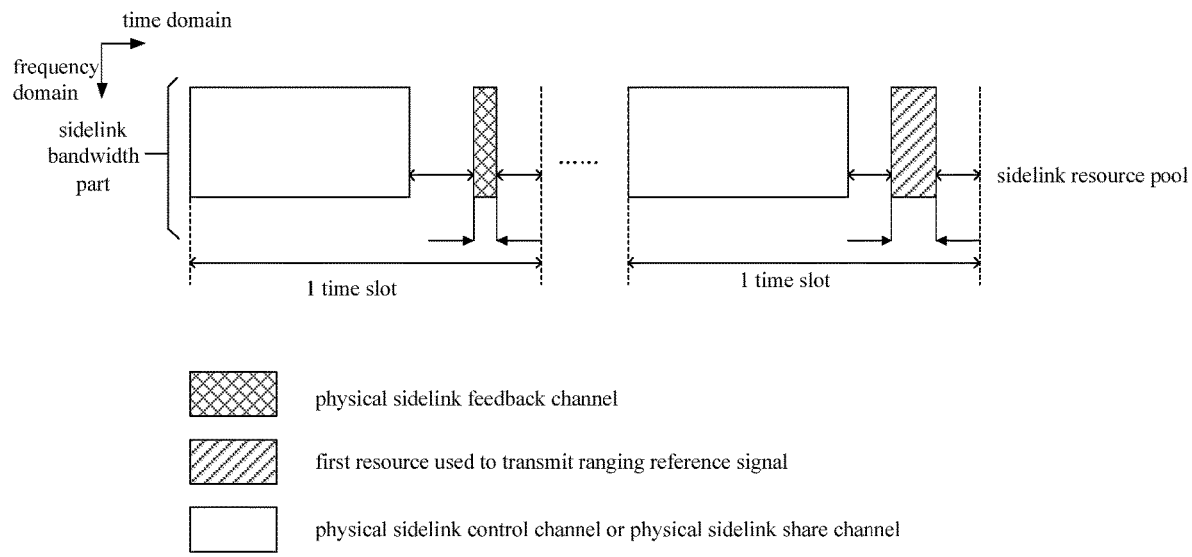
FIG. 4 is a schematic diagram showing that the first resource is time-division multiplexed with the physical sidelink feedback channel and is time-division multiplexed with the physical sidelink control channel or the physical sidelink share channel according to an illustrative embodiment.

In another implementation of the embodiment of the present disclosure, the first resource is time-division multiplexed with the physical sidelink feedback channel, and is time-division multiplexed with the physical sidelink control channel/the physical sidelink share channel. FIG. 4 is a schematic diagram showing that the first resource is time-division multiplexed with the physical sidelink feedback channel, and is time-division multiplexed with the physical sidelink control channel/the physical sidelink share channel according to an illustrative embodiment of the present disclosure. Referring to FIG. 4, the time resource and the frequency resource used to transmit the ranging reference signal are time-division multiplexed with the physical sidelink control channel/the physical sidelink share channel, and also are time-division multiplexed with the physical sidelink feedback channel. In this way, the ranging reference signal may be transmitted by using a different time domain length from the physical sidelink feedback channel, such as 1 symbol. Moreover, the ranging reference signal may also be transmitted by using a wider bandwidth.

Secondly, the time resource and/or the frequency resource used to transmit the ranging reference signal are/is described in a case that the first resource is part of resources in the sidelink bandwidth part.

In the embodiment of the present disclosure, part of time resources and/or frequency resources are indicated on the sidelink bandwidth part used in sidelink communication for the transmission of the ranging reference signal. The part of time resources and/or frequency resources indicated on the sidelink bandwidth part may not belong to any sidelink resource pool.

In the embodiment of the present disclosure, specified time resources and/or frequency resources are configured by pre-configuration or downlink control signaling. When the part of time resources and/or frequency resources indicated on the sidelink bandwidth part are configured, the first resource allocation parameter is configured with an information domain similar to the information domain during the configuration of the part of time resources and/or frequency resources indicated in the sidelink resource pool. In the embodiment of the present disclosure, similarities will not be described in detail again, and only a difference is described below.

The difference lies in that the resources configured when the part of time resources and/or frequency resources indicated in the sidelink resource pool are configured belong to a given sidelink resource pool on the sidelink bandwidth part, while the resources during the configuration of the part of time resources and/or frequency resources indicated on the sidelink bandwidth part belong to the sidelink bandwidth part.

Figure 5:
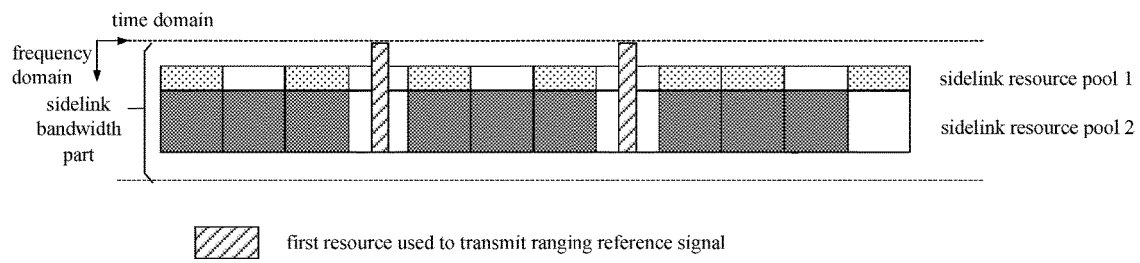
FIG. 5 is a schematic diagram of a correspondence between a frequency domain resource used by a ranging reference signal and a frequency domain width of a sidelink resource pool according to an illustrative embodiment of the present disclosure.

In an implementation, a frequency domain resource width used by the ranging reference signal may exceed a frequency domain width of the sidelink resource pool. FIG. 5 is a schematic diagram of a correspondence between the frequency domain resource used by the ranging reference signal and the frequency domain width of the sidelink resource pool according to an illustrative embodiment. Referring to FIG. 5, the frequency domain resource width used by the ranging reference signal and indicated in the sidelink bandwidth part exceeds frequency domain widths of sidelink resource pool 1 and sidelink resource pool 2.

Figure 6:
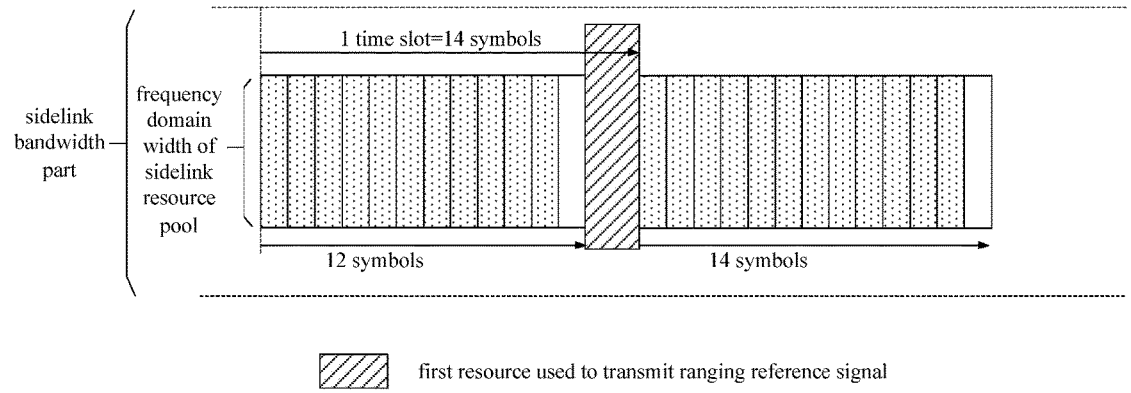
FIG. 6 is a schematic diagram showing that a time resource and/or a frequency resource used by a ranging reference signal overlap/overlaps with a resource in a sidelink resource pool on a specified time unit of a sidelink bandwidth part, and the resource overlapping with the first resource is removed from the sidelink resource pool according to an illustrative embodiment.

In an embodiment of the present disclosure, the first resource may or may not overlap with a resource in a sidelink resource pool on a specified time unit of the sidelink bandwidth part. In an implementation of the embodiment of the present disclosure, in response to that the first resource overlaps with the resource in the sidelink resource pool on the specified time unit of the sidelink bandwidth part, the resource overlapping with the first resource is removed from the sidelink resource pool. That is, when the time resource and/or the frequency resource used by the ranging reference signal overlap/overlaps with the sidelink resource pool, the partial resource overlapping with the time resource and/or the frequency resource used by the ranging reference signal should be removed from the sidelink resource pool. FIG. 6 is a schematic diagram showing that the time resource and/or the frequency resource used by the ranging reference signal overlap/overlaps with the resource in the sidelink resource pool on the specified time unit of the sidelink bandwidth part, and the resource overlapping with the first resource is removed from the sidelink resource pool according to an illustrative embodiment. As shown in FIG. 6, the sidelink resource pool originally occupies time domain resources of 14 symbols in the entire time slot (according to the protocol, the last symbol is the guard period). However, when the time resource and/or the frequency resource used by the ranging reference signal occupy/occupies resources of the last two symbols, only the remaining 12 symbols can be used by the sidelink resource pool in the time slot.

Again, the time resource and/or the frequency resource used to transmit the ranging reference signal are/is described in a case that the first resource is a resource of a specified sidelink bandwidth part.

In an embodiment of the present disclosure, a separate bandwidth part for sidelink ranging is allocated for the transmission of the ranging reference signal. In the transmission of the ranging reference signal, a CP length, a sub-carrier width, and a transmission bandwidth different from those in the sidelink communication transmission may be used.

In an implementation of the embodiment of the present disclosure, part of time resources on the bandwidth part for sidelink ranging may be specified for sidelink ranging. It may also be understood as that the first resource is part of resources in the separate bandwidth part for sidelink ranging.

When the first resource is a resource of a specified sidelink bandwidth part and specified time resources and/or frequency resources in the bandwidth part for sidelink ranging are configured by pre-configuration or downlink control signaling, an information domain for the configuration of the specified time resources and/or frequency resources is similar to an information domain for the configuration of part of time resources and/or frequency resources indicated on the sidelink bandwidth part. In the embodiment of the present disclosure, similarities will not be described in detail again, and only a difference is described below.

The difference lies in that a time frequency parameter of the bandwidth part for sidelink ranging needs to be used for configuration. For example, the sidelink bandwidth part has a sub-carrier interval of 30 KHz and a bandwidth of 20 MHz. The bandwidth part for sidelink ranging may have a sub-carrier interval of 60 KHz and a bandwidth of 100 MHz.

The configuration of the bandwidth part for sidelink ranging is similar to that of another bandwidth part, and includes at least one or more of the following: an offset of the lowest sub-carrier of the specified sidelink bandwidth part from a specified frequency position; a bandwidth of the specified sidelink bandwidth part; and a sub-carrier interval and a cyclic prefix length of the specified sidelink bandwidth part.

Figure 7:
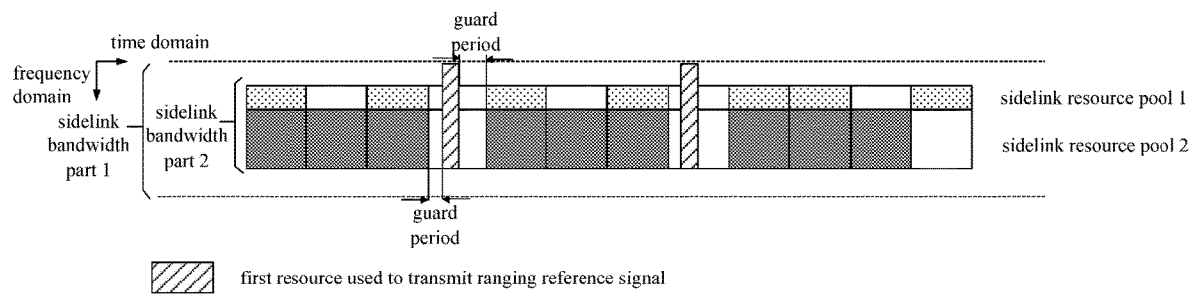
FIG. 7 is an example diagram of allocation of a bandwidth part for sidelink ranging according to an illustrative embodiment.

FIG. 7 is an example diagram of allocation of a bandwidth part for sidelink ranging according to an illustrative embodiment. Referring to FIG. 7, the bandwidth part for sidelink ranging may occupy a bandwidth range beyond the sidelink bandwidth part. The user equipment needs to set aside a necessary switching guard period between sidelink communication and sidelink ranging sending/receiving.

Again, a situation in which the first resource allocation parameter directly indicates the first source is described.

In an embodiment, the first resource allocation parameter directly indicates a sub-carrier width and a CP length used for transmission of the ranging reference signal, and indicates a time domain position of the first resource according to the indicated sub-carrier width and CP length. In an implementation, the first resource allocation parameter may directly indicate an absolute frequency domain position of a frequency domain reference point and indicate a frequency domain offset of the first resource relative to the frequency domain reference point.

In an embodiment of the present disclosure, an implementation process of directly indicating the first resource used by the ranging reference signal is similar to an implementation process in which the first resource is at least part of resources in the specified sidelink bandwidth part, and a difference lies in that a time domain and/or frequency domain position of the first resource is directly indicated. Therefore, similarities will not be described in detail herein in the embodiment of the present disclosure.

In the resource allocation method according to the embodiment of the present disclosure, the reuse of the existing sidelink communication design may be maximized by allocating part of resources in the sidelink resource pool as the first resource used to transmit the ranging reference signal. However, the selection of the transmission bandwidth of the ranging reference signal is limited by the existing sidelink resource pool, which may affect the performance of ranging. Allocating part of resources in the sidelink bandwidth part as the first resource used to transmit the ranging reference signal or allocating resources in a specified communication bandwidth part dedicated to transmission of the ranging reference signal is more conducive to the design of a new sidelink ranging reference signal, gives full play to the role of the ranging reference signal, and improves the accuracy of ranging, but requires more protocol changes and implementation complexity.

In the resource allocation method according to the embodiment of the present disclosure, by allocating the first resource allocation parameter used to indicate the first resource that is used to transmit the ranging reference signal, transmission resources can be allocated to the ranging reference signal, thus providing a possibility of using sidelink communication signals for sidelink ranging, and meeting the need of ranging through wireless signals.

Based on the same concept, an embodiment of the present disclosure further provides a resource allocation apparatus.

It may be understood that, in order to realize the above functions, the resource allocation apparatus according to the embodiment of the present disclosure includes corresponding hardware structures and/or software modules configured to perform the various functions. In combination with the units and algorithm steps of the examples disclosed in the embodiments of the present disclosure, the embodiments of the present disclosure can be implemented in the form of hardware or a combination of hardware and computer software. Whether a function is executed by hardware or in the form of computer software driving hardware depends on the specific application and design constraints of the technical solution. Those skilled in the art may use different methods to realize the described functions for each specific application, but this realization should not be considered beyond the scope of the technical solutions of the embodiments of the present disclosure.

Figure 8:
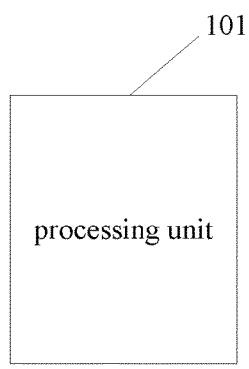
FIG. 8 is a block diagram of a resource allocation apparatus according to an illustrative embodiment.

FIG. 8 is a block diagram of a resource allocation apparatus according to an illustrative embodiment. Referring to FIG. 8, a resource allocation apparatus 100 includes a processing unit 101. The processing unit 101 is configured to determine a first resource allocation parameter. The first resource allocation parameter is used to indicate a first resource, and the first resource is used to transmit a ranging reference signal.

In an implementation, the first resource is at least part of resources in a sidelink resource pool.

In an implementation, the first resource is at least part of resources in a sidelink bandwidth part.

In an implementation, the first resource is at least part of resources in a specified sidelink bandwidth part.

In an implementation, the first resource is a resource occurring periodically in time-domain.

In an implementation, the first resource includes resources continuous in frequency-domain.

In an implementation, the first resource is frequency-division multiplexed and/or time-division multiplexed with a resource configured to transmit a sidelink signal.

In an implementation, the first resource is frequency-division multiplexed with a physical sidelink feedback channel, and is time-division multiplexed with a physical sidelink control channel or a physical sidelink share channel.

In an implementation, the first resource is time-division multiplexed with a physical sidelink feedback channel, and is time-division multiplexed with a physical sidelink control channel or a physical sidelink share channel.

In an implementation, a guard period exists between the first resource and a physical sidelink control channel or a physical sidelink share channel.

In an implementation, in response to that the first resource overlaps with a resource in a sidelink resource pool on a specified time unit of the sidelink bandwidth part, the processing unit 101 is further configured to remove the resource overlapping with the first resource from the sidelink resource pool.

In an implementation, the first resource allocation parameter includes one or more of the following: an offset of a lowest sub-carrier of the specified sidelink bandwidth part from a specified frequency position; a bandwidth of the specified sidelink bandwidth part; and a sub-carrier interval and a cyclic prefix length of the specified sidelink bandwidth part.

In an implementation, a signal format of the ranging reference signal corresponds to one or more of: a time domain length, a frequency domain width, and a resource multiplexing manner.

In an implementation, a transmission parameter of the ranging reference signal corresponds to one or more of: a time domain length, a frequency domain width, and a transmission power configuration.

In an implementation, the first resource allocation parameter is carried in pre-configuration information, a static instruction, or a semi-static instruction.

In an implementation, the semi-static instruction includes downlink semi-static signaling or sidelink semi-static control signaling.

Regarding the apparatuses in the above embodiments, the specific manners in which the various modules perform operations have been detailed in the embodiments related to the method, and will not be elaborated herein.

Figure 9:
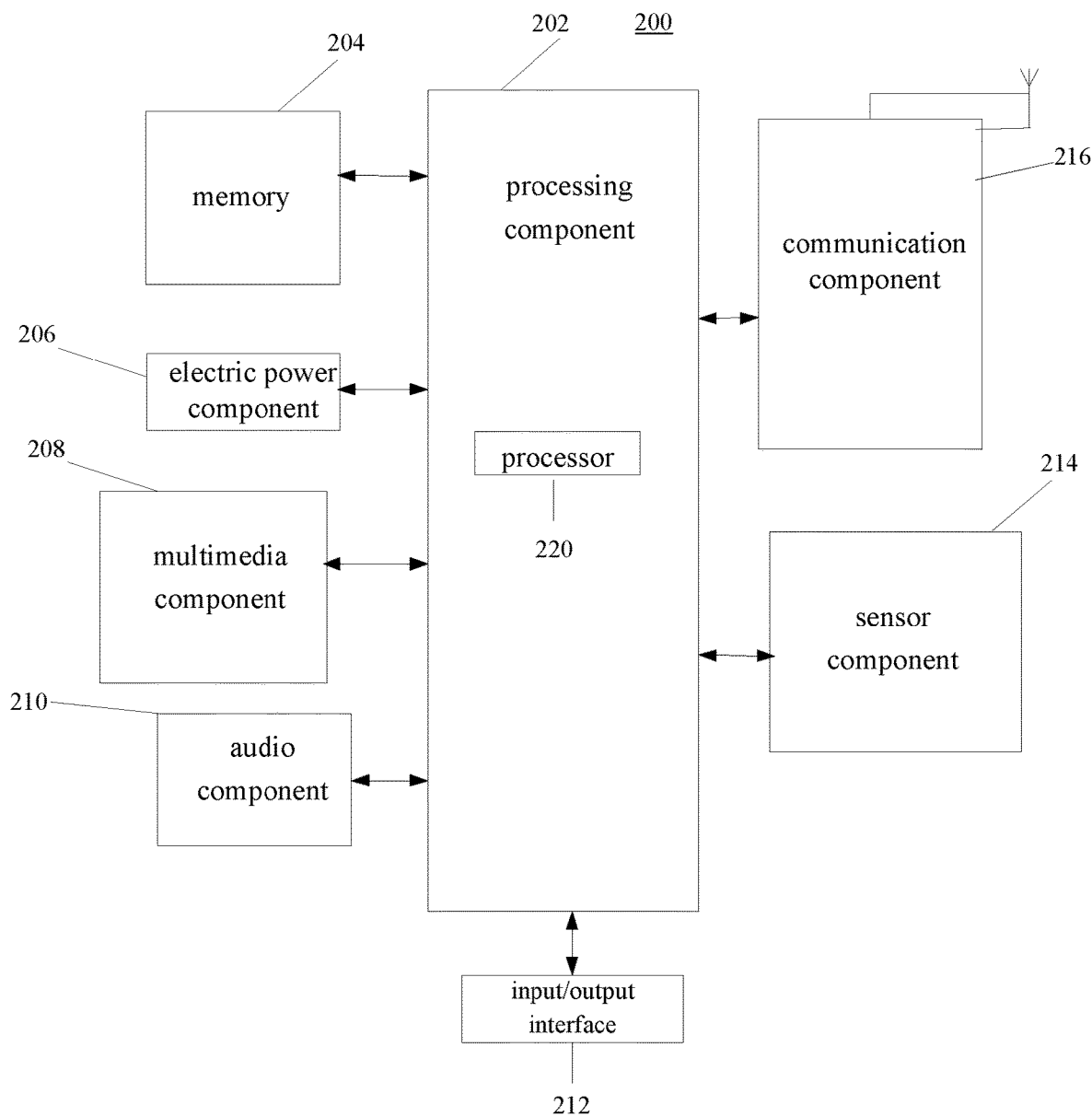
FIG. 9 is a block diagram of an apparatus for resource allocation according to an illustrative embodiment.

FIG. 9 is a block diagram of a resource allocation apparatus 200 according to an illustrative embodiment. For example, the resource allocation apparatus 200 may be a mobile phone, a computer, a digital broadcast device, a messaging device, a game console, a tablet device, a medical device, a fitness device, a personal digital assistant, and the like.

As illustrated in FIG. 9, the apparatus 200 may include one or more components of the following: a processing component 202, a memory 204, an electric power component 206, a multimedia component 208, an audio component 210, an input/output (I/O) interface 212, a sensor component 214 and a communication component 216.

The processing component 202 usually controls an overall operation of the apparatus 200, such as operations associated with display, telephone calls, data communications, camera operations, and recording operations. The processing component 202 may include one or more processors 220 to execute instructions, to complete all or part of the steps in the above methods. In addition, the processing component 202 may include one or more modules which facilitate interaction between the processing component 202 and other components. For example, the processing component 202 may include a multimedia module to facilitate interaction between the multimedia component 208 and the processing component 202.

The memory 204 is configured to store various types of data to support operations at the apparatus 200. Examples of such data include instructions for any application programs or methods operated on the apparatus 200, contact data, phonebook data, messages, pictures, videos, etc. The memory 204 may be implemented by any type of volatile or non-volatile storage devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The electric power component 206 provides electric power to various components of the apparatus 200. The electric power component 206 may include a power management system, one or more power sources, and other components related to generation, management, and distribution of electric power in the apparatus 200.

The multimedia component 208 includes a screen that provides an output interface between the apparatus 200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 208 includes a front camera and/or a rear camera. When the apparatus 200 is in an operation mode, such as a photographing mode or a video mode, the front camera and/or the rear camera may receive external multimedia data. Each of the front and rear cameras may be a fixed optical lens system or have a focus and optical zoom capability.

The audio component 210 is configured to output and/or input audio signals. For example, the audio component 210 includes a microphone (MIC) configured to receive an external audio signal when the apparatus 200 is in an operating mode, such as a call mode, a recording mode, and a speech recognition mode. The received audio signal may be further stored in the memory 204 or transmitted via the communication component 216. In some embodiments, the audio component 210 further includes a loudspeaker, which is configured to output the audio signals.

The I/O interface 212 provides an interface between the processing component 202 and a peripheral interface module, such as a keyboard, a click wheel, a button and the like.

The buttons may include, but are not limited to, a home button, a volume button, a starting button, and a locking button.

The sensor component 214 includes one or more sensors for providing state assessments of various aspects of the apparatus 200. For example, the sensor component 214 may detect an on/off state of the apparatus 200, a relative positioning of the components, such as the display and the keypad of the apparatus 200, a change in position of the apparatus 200 or of a component of the apparatus 200, a presence or an absence of the user's contact with the apparatus 200, an orientation or an acceleration/deceleration of the apparatus 200, and a change in temperature of the apparatus 200. The sensor component 214 may include a proximity sensor configured to detect the presence of nearby objects without any physical contact. The sensor component 214 may also include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate wired or wireless communication between the apparatus 200 and other devices. The apparatus 200 can access a wireless network based on a communication standard, such as Wi-Fi, 2G, or 3G, or a combination of them. In an illustrative embodiment, the communication component 216 receives a broadcast signal or broadcast related information from an external broadcast management system via a broadcast channel. In an illustrative embodiment, the communication component 216 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the apparatus 200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the methods described above.

In an illustrative embodiment, there is also provided a non-transitory computer readable storage medium including instructions, such as the memory 204 including instructions. The instructions can be executed by the processor 220 of the apparatus 200 to perform the methods described above. For example, the non-transitory computer readable storage medium may be a ROM, a random access memory (RAM), a CD-ROM, a magnetic tape, a floppy disk, an optical data storage device, and the like.

Figure 10:
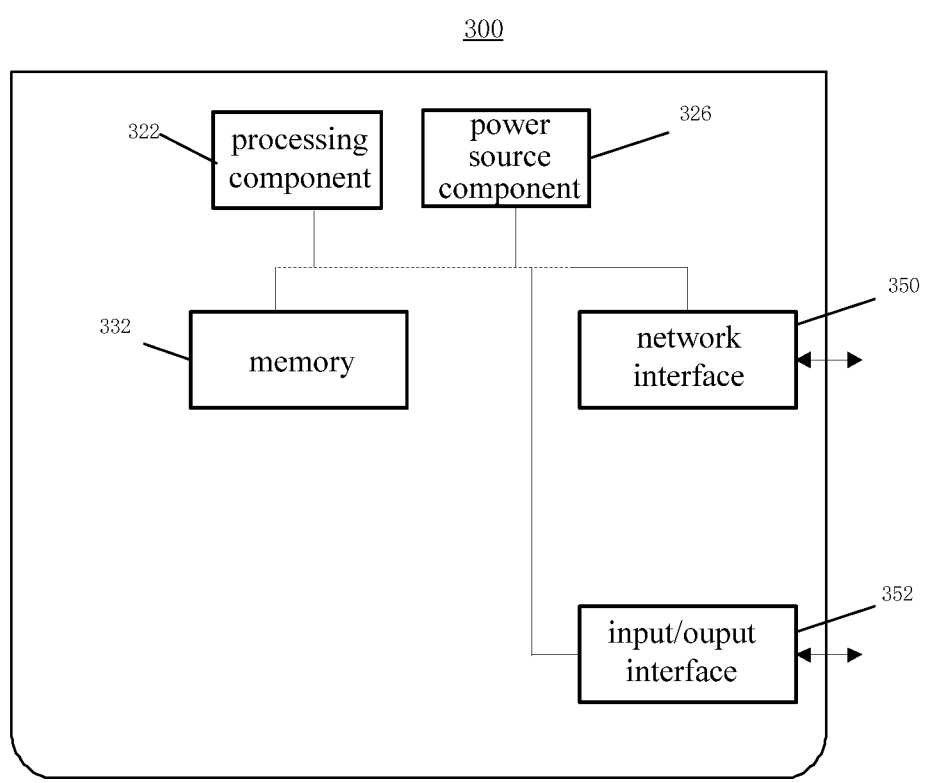
FIG. 10 is a block diagram of an apparatus for resource allocation according to an illustrative embodiment.

FIG. 10 is a block diagram of a resource allocation apparatus 300 according to an illustrative embodiment of the present disclosure. For example, the apparatus 300 may be provided as a server. Referring to FIG. 10, the apparatus 300 includes a processing component 322, and the processing component 322 further includes one or more processors, and a memory resource represented by a memory 332, configured to store an instruction, such as an application program, that may be executed by the processing component 322. The application program stored in the memory 332 may include one or more modules each corresponding to a set of instructions. In addition, the processing component 322 is configured to execute the instruction, so as to perform the above method.

The apparatus 300 may further include a power source component 326 configured to perform the power management of the apparatus 300, a wired or wireless network interface 350 configured to connect the apparatus 300 to the network, and an input/output (I/O) interface 352. The apparatus 300 may operate an operating system stored in the memory 332, such as a Windows Server™, a Mac OS X™, a Unix™, a Linux™, a FreeBSD™ or the like.

In illustrative embodiments, a non-transitory computer-readable storage medium including instructions, for example, a memory 332 including instructions, is further provided. The instructions may be performed by a processing component 322 of the apparatus 300 to complete the above method. For example, the non-transitory computer-readable storage medium may be a ROM, a random access memory (RAM), a CD-ROM, a magnetic tape, a floppy disc, an optical data storage device or the like.

It may be further understood that "a plurality of" in the present disclosure indicates two or more, and other quantifiers are similar to this. The term "and/or" describes an association relationship of associated objects, indicating that three relationships may exist. For example, A and/or B may represent the following three cases: Only A exists, both A and B exist, and only B exists. The character "/" generally indicates that the associated former and latter objects are in an "or" relationship. The singular forms "a/an", "one", and "the" are also intended to include plural forms, unless otherwise clearly specified in the context.

It may be further understood that the terms "first", "second", etc. are used to describe various information, but the information should not be limited to these terms. These terms are only used to distinguish the same type of information from each other, and do not indicate a specific order or degree of importance. In fact, the terms such as "first" and "second" may be used interchangeably. For example, without departing from the scope of the present disclosure, the first information may also be referred to as the second information, and similarly, the second information may also be referred to as the first information.

It may be further understood that, although the operations are described in a specific order in the drawings in the embodiments of the present disclosure, it should not be understood that the operations are required to be performed in the shown specific order or in a serial order, or all the shown operations need to be performed to get a desired result. In specific circumstances, multitasking and parallel processing may be advantageous.

Those skilled in the art will be aware of other embodiments of the present disclosure after considering the specification and practicing the invention disclosed herein. The present application is intended to cover any variations, uses, or adaptive changes of the present disclosure, which follow the general principles of the present disclosure and include common knowledge or conventional technical means in the technical field not disclosed in the present disclosure. The specification and the embodiments are to be regarded as illustrative only, and the true scope and spirit of the present disclosure are indicated in the following claims.

It may be appreciated that the present disclosure is not limited to the exact structure that has been described above and illustrated in the accompanying drawings, and that various modifications and changes may be made without departing from the scope of the present disclosure. The scope of the present disclosure is only limited by the appended claims.

The invention claimed is:

1. A resource allocation method, comprising:
   determining a first resource allocation parameter,
   the first resource allocation parameter being configured to indicate a first resource, the first resource being configured to transmit a ranging reference signal,
   wherein a signal format of the ranging reference signal corresponds to: a time domain length and a resource multiplexing manner,
   wherein the resource allocation method further comprises:
   determining a bitmap of N bits based on the first resource allocation parameter, wherein the bitmap of N bits is configured to determine a starting symbol and a duration, and N is a positive integer; and
   determining a time resource of the first resource based on the starting symbol and the duration.

2. The resource allocation method according to claim 1, wherein the first resource is at least part of resources in a sidelink resource pool.

3. The resource allocation method according to claim 2, wherein the first resource is a resource occurring periodically in time-domain.

4. The resource allocation method according to claim 2, wherein the first resource comprises resources continuous in frequency-domain.

5. The resource allocation method according to claim 2, wherein the first resource is subjected to at least one of frequency-division multiplexing or time-division multiplexing with a resource configured for transmitting a sidelink signal.

6. The resource allocation method according to claim 5, wherein the first resource is frequency-division multiplexed with a physical sidelink feedback channel, and is time-division multiplexed with at least one of a physical sidelink control channel or a physical sidelink share channel.

7. The resource allocation method according to claim 5, wherein the first resource is time-division multiplexed with a physical sidelink feedback channel, and is time-division multiplexed with at least one of a physical sidelink control channel or a physical sidelink share channel.

8. The resource allocation method according to claim 2, wherein a guard period exists between the first resource and at least one of a physical sidelink control channel or a physical sidelink share channel.

9. The resource allocation method according to claim 1, wherein the first resource is at least part of resources in a sidelink bandwidth part.

10. The resource allocation method according to claim 9, further comprising:
    in response to that the first resource overlaps with a resource in a sidelink resource pool on a specified time unit of the sidelink bandwidth part, removing the resource overlapping with the first resource from the sidelink resource pool.

11. The resource allocation method according to claim 1, wherein the first resource is at least part of resources in a specified sidelink bandwidth part.

12. The resource allocation method according to claim 11, wherein the first resource allocation parameter comprises at least one of the following:
    an offset of a lowest sub-carrier of the specified sidelink bandwidth part from a specified frequency position;
    a bandwidth of the specified sidelink bandwidth part; or
    a sub-carrier interval and a cyclic prefix length of the specified sidelink bandwidth part.

13. The resource allocation method according to claim 1, wherein the first resource allocation parameter comprises at least one of the following:
    a specified sub-carrier width and a cyclic prefix length;
    time domain positions indicated by the specified sub-carrier width and the cyclic prefix length; or
    an absolute frequency domain position of a frequency domain reference point, and a frequency domain offset of the first resource relative to the frequency domain reference point.

14. The resource allocation method according to claim 1, wherein a transmission parameter of the ranging reference signal corresponds to at least one of: a time domain length, a frequency domain width, or a transmission power configuration.

15. The resource allocation method according to claim 1, wherein the first resource allocation parameter is carried in at least one of pre-configuration information, a static instruction, or a semi-static instruction.

16. The resource allocation method according to claim 15, wherein the semi-static instruction comprises at least one of downlink semi-static signaling or sidelink semi-static control signaling.

17. A resource allocation apparatus, comprising:
    a processor; and
    a memory configured to store an instruction executable by the processor;
    wherein the processor is configured to determine a first resource allocation parameter,
    the first resource allocation parameter is configured to indicate a first resource, and the first resource is configured to transmit a ranging reference signal,
    wherein a signal format of the ranging reference signal corresponds to: a time domain length and a resource multiplexing manner,
    wherein the resource allocation method further comprises:
    determining a bitmap of N bits based on the first resource allocation parameter, wherein the bitmap of N bits is configured to determine a starting symbol and a duration, and N is a positive integer; and
    determining a time resource of the first resource based on the starting symbol and the duration.

18. The resource allocation apparatus according to claim 17, wherein the first resource is at least part of resources in at least one of a sidelink resource pool, a sidelink bandwidth part or a specified sidelink bandwidth part.

19. The resource allocation apparatus according to claim 17, wherein the first resource allocation parameter comprises at least one of the following:
    a specified sub-carrier width and a cyclic prefix length;
    time domain positions indicated by the specified sub-carrier width and the cyclic prefix length; or
    an absolute frequency domain position of a frequency domain reference point, and a frequency domain offset of the first resource relative to the frequency domain reference point.

* * * * *